Patented Mar. 20, 1934

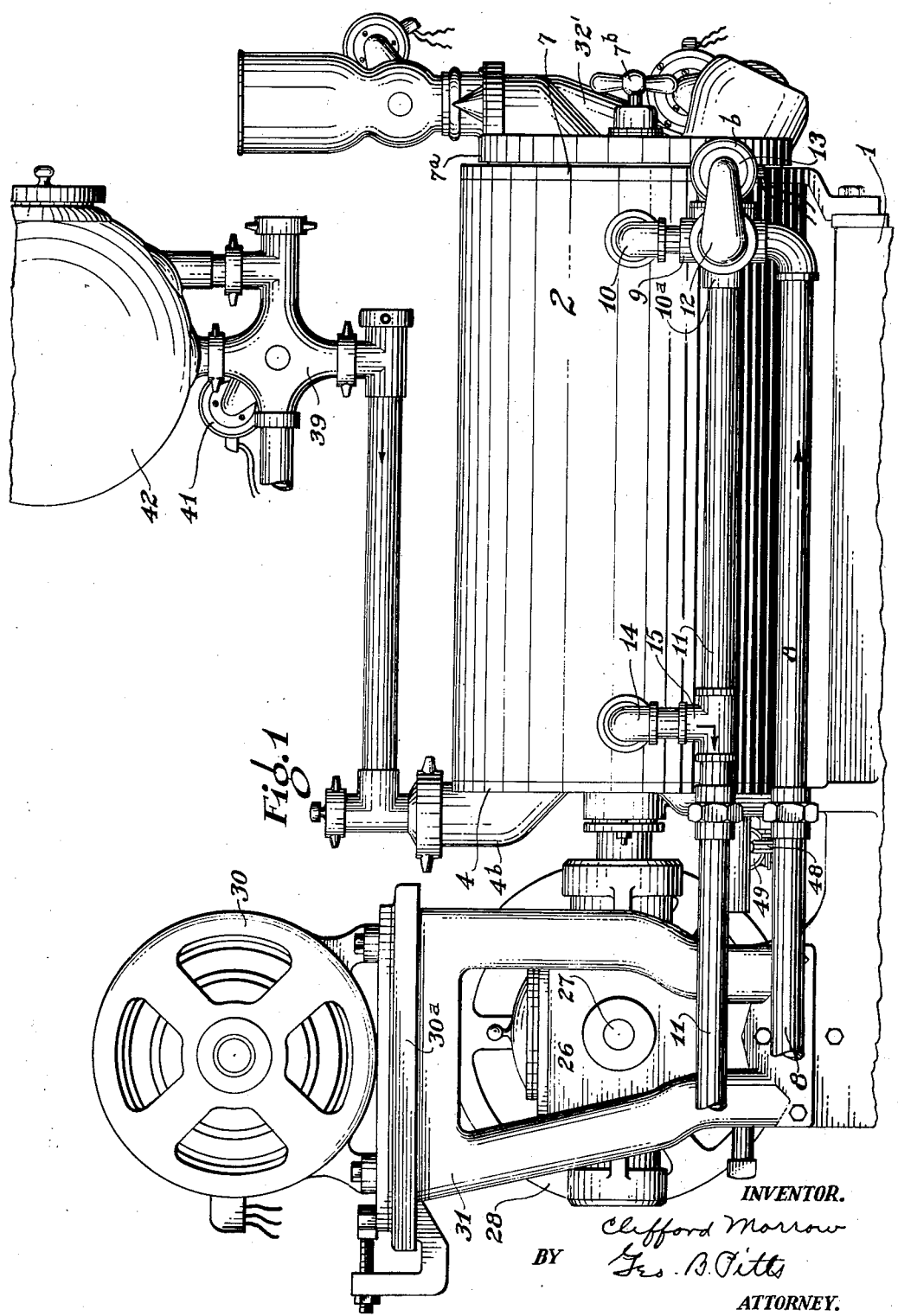

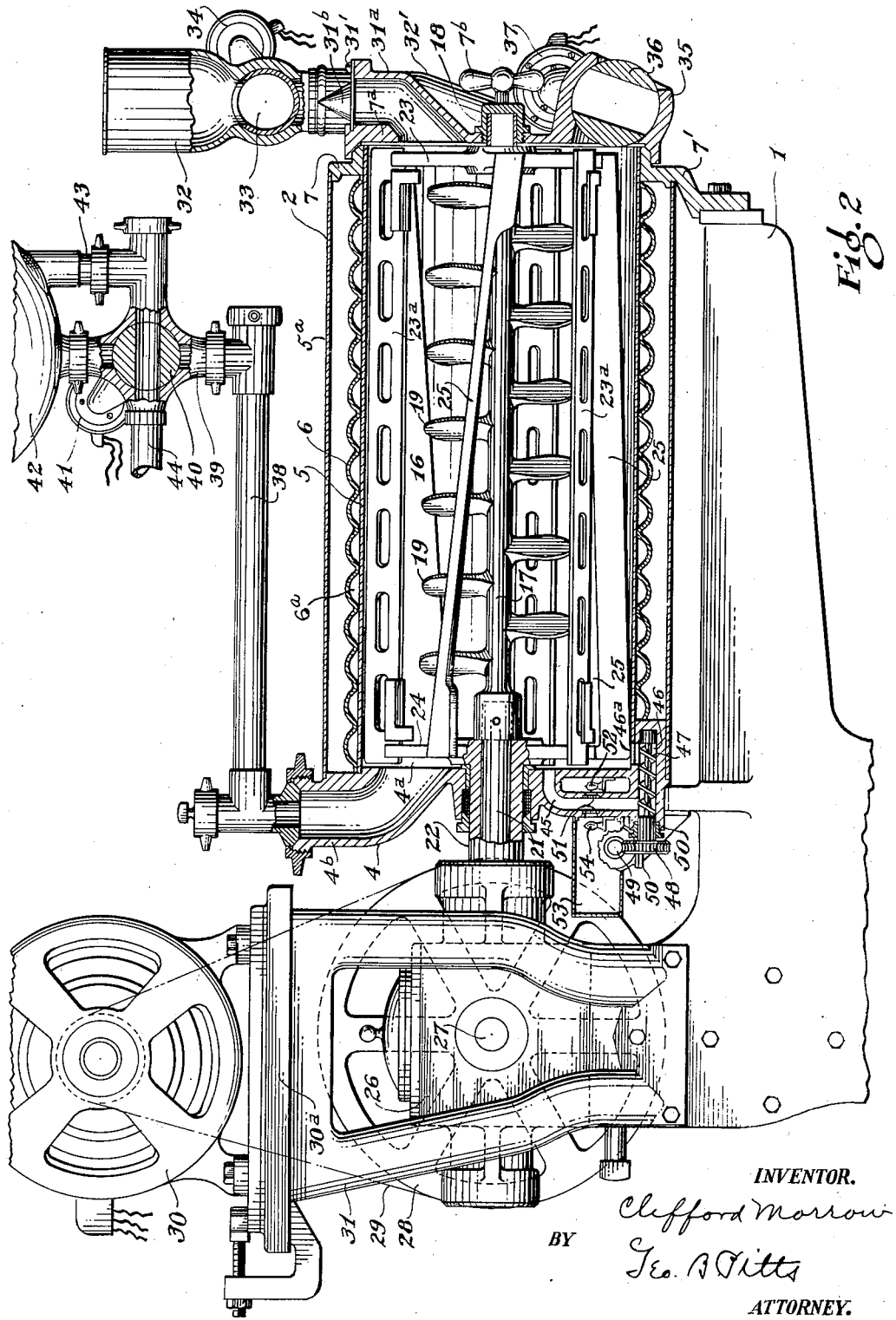

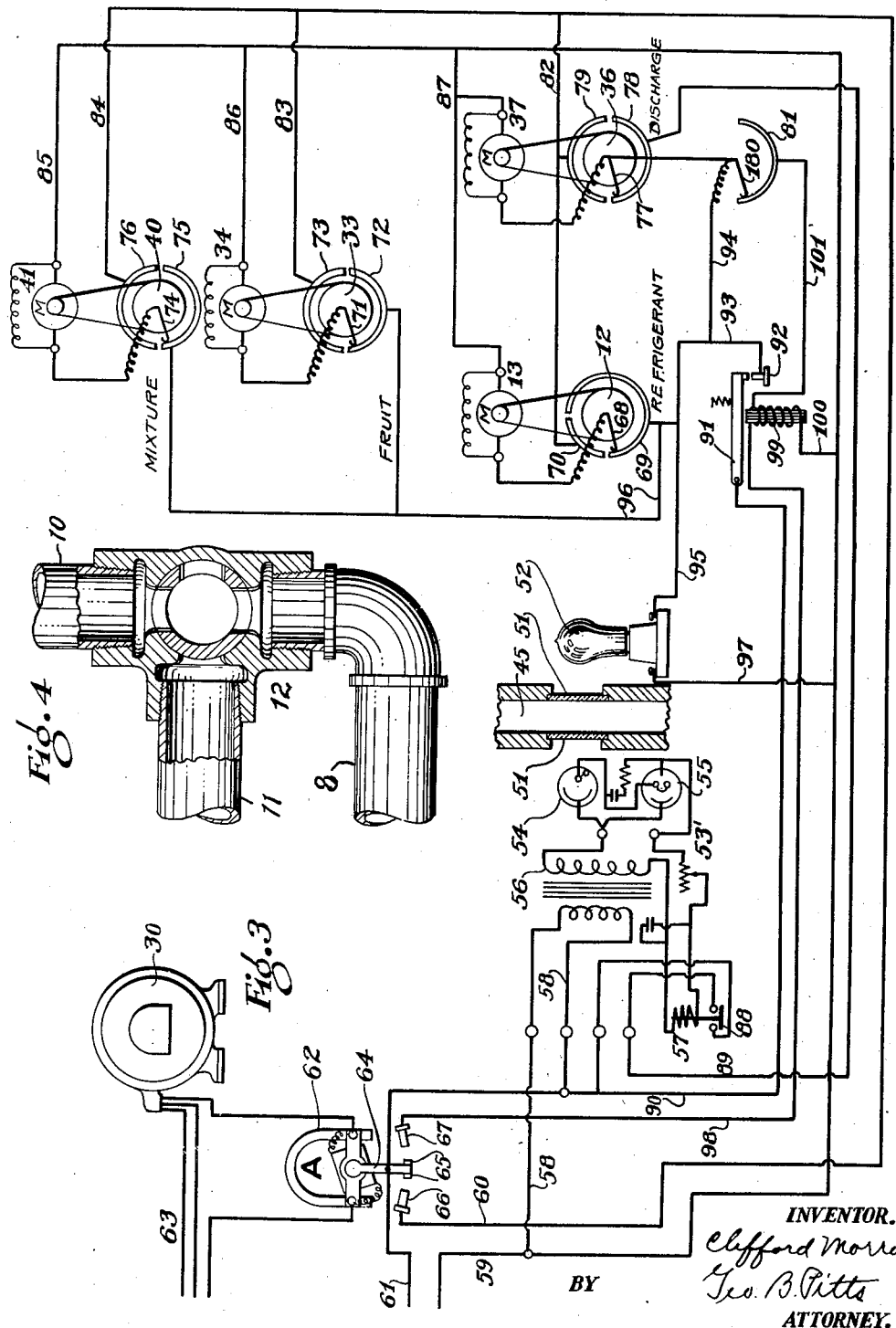

1,951,365

UNITED STATES PATENT OFFICE 1,951,365

FREEZING APPARATUS

Clifford Morrow, Canton, Ohio, assignor to The
H. H. Miller Industries Company, Canton, Ohio,
a corporation of Ohio Application December 29, 1930, Serial No. 505,319

20 Claims. (Cl. 62—114)

This invention relates to a novel method for controlling one or more of the several operations in the automatic production of ice-cream or other frozen products and for an improved apparatus for effecting these results.

In the commercial production of ice-cream and other like frozen products it is usual to introduce the "mix" or batch (which has been previously prepared from cream and other materials) into a freezer and carry out the freezing operation to obtain a product which has the desired consistency or yield, after which the frozen batch is discharged from the freezer. In carrying out such an operation it is of course necessary that the "mix" or batch be measured and introduced into the machine by the operator. The operator is also called upon to start the freezing operation and to control manually the freezing and supply and cut-off of the refrigerant, to test the product during freezing to determine its over-run or yield, and to discharge the finished product from the freezer.

It is a purpose of my invention to accomplish any one or more of the above operations of introducing a measured quantity of the mix or batch into the freezer, maintaining the proper degree of refrigeration, determining the completion of the freezing operation, controlling the supply of the refrigerant, determining the degree of over-run and the discharge of the product, and the repetition of this cycle in an automatic manner without the necessity for supervision by an operator.

It is a further object of my invention to provide for controlling the freezing operation and for the discharge of the product by a method and means which shall be directly responsive to the characteristic change or changes in condition of the product during its freezing.

Another object of my invention in the provision of improved means for supplying the mix to the freezer, carrying out the freezing operation and discharging the frozen products from the freezer in response to the automatic control above referred to.

A further object of the invention is to provide an improved process of automatically controlling the freezing of materials by first utilizing the increase of the load on the driving motor incident to the freezing of the material to determine one step of the freezing operation and then utilizing the consistency of the material resulting from further agitation to determine the final step of freezing.

A further object of the invention is to provide a freezing mechanism wherein the freezing of materials with resulting predetermined yields or overruns may be effected without requiring testing of the product during freezing.

A still further object of the invention is to provide, in a freezing mechanism, automatically operated signaling devices controlled by the change or changes in the condition of the product during freezing thereof, whereby the operative can effect manual operation of freezing each batch of the mix, thereby eliminating testing of the product and facilitating the complete freezing of each batch.

Other objects of my invention will be apparent from the following description of my improved process and of the preferred form of my improved mechanism in connection with the accompanying drawings, in which—

Fig. 1 is a side elevation of a freezing mechanism;

Fig. 2 is a vertical longitudinal section of the freezing mechanism, and

Fig. 3 is a diagrammatic representation of the electric system for controlling the operations of the freezing mechanism.

Fig. 4 is a fragmentary section of the valve for controlling the supply of refrigerant.

By way of example, I have illustrated my invention as embodied in a freezer of well known type, in which a standard or base 1 supports a freezing chamber indicated as an entirety at 2.

The chamber 2 comprises an inner cylinder 5 and a means for applying a refrigerant to said cylinder. These means, when brine is used as a refrigerant, may consist of a corrugated cylinder 6 having its corrugations secured to the cylinder walls to provide a coil or circuitous passage 6a for the refrigerant. The cylinder 6 may be constructed in accordance with the disclosure in Letters Patent No. 878,225, dated February 4, 1908. An outer cylinder 5a is provided to enclose cork or other non-heat conducting material to suitably insulate the coil 6a and cylinder 5. At their rear ends, the cylinders 5 and 5a are suitably secured to a head 4, which closes the rear end of the inner cylinder, except as hereinafter explained; at their front ends, the cylinders 5 and 5a are suitably secured to a ring 7, the latter having a depending bracket 7' which is secured to the support 1, as shown in Fig. 2, to support the front end of the chamber 2. The ring 7 is provided with a seat to which is removably secured a front head 7a; suitable devices (one being shown at 7b) being provided between the head 7a and ring 7 for removably securing the head in position.

The brine or refrigerant system comprises a supply pipe 8 connected with a three-way valve casing 9. This valve casing 9 has one outlet pipe 10 connected with the brine passage-way 6a at the front end of the cylinder 5 and another outlet 10a connected with a return pipe 11. The valve 12 is mounted within the valve casing 9 and connected operatively by gearing, linkage or the like to an electric motor 13 mounted upon one side of the valve casing 9.

The valve 12 is adapted to connect the pipe 8 either to pipe 10 or the return pipe 11 dependent upon the demand made by the freezer or upon the operation which is being carried out.

The brine after traversing the coil 6a is discharged through the discharge pipe 14 into a T joint 15 forming part of the return pipe 11. In this way the flow of the brine is circulated through the coil 6a or returned directly through the pipe 11 to its source of supply where its temperature is again lowered, and it may be circulated back to the freezer.

The rear head 4 is formed in its upper portion with an inlet 4a for the material to be frozen. The head 4 is shaped to provide a duct 4b leading to the inlet 4a. The material to be frozen is supplied to the duct 4b in the manner to be later set forth.

16 indicates as an entirety the agitating and ejecting mechanism for the "mix". This mechanism consists of inner and outer members, adapted to rotate in opposite directions. The inner member comprises a shaft 17, supported at its front end in a cup member 18, and a series of paddles or blades 19 spaced along the shaft, these blades being inclined relative to the axis of the shaft 17 whereby the blades tend to force the material toward one end of the cylinder 5. The rear end of the shaft 17 is connected to a shaft 21, which is mounted in and extends through a hollow shaft 22; the latter extending through and having bearing in an axial opening formed in the rear head 4. The outer agitating member comprises a pair of front and rear spiders 23, 24, having hubs which rotate on the shaft 17, the rear hub being connected to the hollow shaft 22. Certain of the arms of the spiders pivotally support scraping blades 23a; whereas certain of the remaining arms of the spiders support spiral bars 25, which serve as ejectors when the discharge valve is opened.

The shafts 21 and 22 are rotated in opposite directions by means of the customary set of miter gears which are mounted within the gear case 26, the cross shaft 27 for the intermediate gear being driven by means of a pulley wheel 28 and pulley belt 29 from an electric motor 30. Motor 30 is suitably mounted upon a base 30a, the latter being supported by a frame 31, which in turn rests on the standard 1.

The front head is formed in its upper portion with an opening connected to a duct 31a, which leads upwardly, the upper open end of the duct being closed by a pivoted cover 31b. By swinging the cover 31b about its pivot 31', inspection of the material which may rise or be forced up into duct 31a may be made.

At one side of the cup member 18, that is, that side relative to which the arms of the spider 23 move downwardly, the head 7a is formed with an inlet opening (not shown) to which is connected a duct 32', the latter leading upwardly and supporting at its upper end a suitable funnel 32. The purpose of the funeral 32, duct 32' and inlet opening is to provide for the introduction of flavoring materials, more particularly fruit (usually in crushed condition) at the desired period of freezing. The construction of the chamber 2, agitating mechanism and drive mechanism may be similar to that shown in Letters Patent No. 1,692,693, dated November 27, 1925, and granted to Wm. H. Thompson.

In the method of operating the apparatus herein disclosed, the introduction of the fruit is effected at the end of the freezing step or at the commencement of the whipping-up step to effect the desired yield; that is, the freezing step consists in supplying the refrigerant and agitating the "mix" in the chamber 5 until its temperature is reduced to the desired degree, for example, 24 degrees F., at which time the supply of refrigerant is cut off and the whipping-up step consists in further agitating the "mix" to effect the predetermined desired yield. As the temperature of "mix" becomes lowered in carrying out the freezing step above described, its viscosity increases and imparts an increasing torque reaction or load on the motor 30. The load resulting when the freezing has been carried to the predetermined degree, is utilized in the manner later set forth to shut off the refrigerant supply, whereby the whipping up step may be carried out.

The fruit is introduced through the hopper 32 into a rotary valve 33, which is shaped to hold a predetermined quantity of the fruit or other flavoring material, the valve having an opening which registers with the funnel 32 when the valve is in the position shown in Fig. 2. By rotating the valve 33 one hundred and eighty degrees, the valve opening registers with the duct 32' and allows the fruit to flow into the chamber 5. The rotation of the valve 33 is effected in the manner hereinafter explained.

Mounted on the side of the hopper 32 is an electric motor 34 suitably geared to the valve 33, so that the latter may be fully opened or closed by a rotative movement of 180 degrees.

Forming part of the head 7a and in line with the bottom of the chamber 5 there is provided a suitable discharge or outlet valve casing 35. A rotary valve 36 is mounted in the casing 35 and operatively connected with an electric motor 37. By this connection valve 36 may either be maintained closed or operated into full open position for the discharge of the completed product, by a rotation of 90 degrees.

Piping 38 connects the duct 4b with a two-way valve casing 39. The rotary valve member 40 in valve casing 39 is operated by a driving connection with an electric motor 41, preferably mounted upon the valve casing 39. A tank 42 (a portion only of which is shown) is supported above the valve casing 39 and is adapted to receive a quantity of the material or "mix" to be introduced into the chamber 5. The tank is by preference provided with means (not shown) which stops or cuts off the supply when the desired quantity flows thereinto.

The tank 42 is supplied with the material from pipe 43 on one side of the valve casing 39, this pipe being connected through the valve casing 39 and valve member 40 to a pipe 44, which leads from a source of supply, when the valve member 40 is in the position shown in Fig. 2. The valve member 40 is rotated 90 degrees from the position shown in Fig. 2, by the motor 41, to permit discharge of the tank 42, as hereinafter set forth, such discharge being downwardly through the valve when its passage is in vertical position and through the pipe 38 to the duct 4b.

The lower part of the head 4 is shaped to provide a conduit through which the material circulates during the operation of freezing and by which certain steps of this operation are controlled.

The conduit comprises connected passageways 45, 46, the former being disposed exteriorly of and in spaced relation to the head 4 and connected at its outer end with the material freezing space and the latter extending horizontally and having a lateral opening 46a which communicates with the interior of the material freezing space. A conveyor 47, such as a spiral or screw is mounted to rotate in the passage-way 46 and serves to convey material flowing thereinto through such passage-way and through the passage-way 45 back into the freezing space. As shown the passage-ways 45, 46, are at angles to each other so that the shank of the conveyor may extend through a side wall of the duct and be driven through gearing 48 by the shaft of an electric motor 49, a gland 50 for the shank being provided to prevent leakage. The motor 49 is preferably continuously maintained in operation as long as the motor 30 is operated and may therefore be controlled by the same main switch. The circuit for the motor 49 is omitted from the diagram (Fig. 3) as being unnecessary, as it is not connected into any of the circuits shown therein.

The passage-way 45 has intermediate its ends two oppositely disposed transparent windows 51, 51, which are provided to allow the mixture, as it is forced through the passage-way 45 by the conveyor 47, to be utilized as a means for controlling certain steps of the freezing operation, as later set forth. Mounted on the head 4, exterior to and opposite the window 51 at one side of the passage-way 45, is the electric light 52. On the opposite side of the passage-way 45 is a casing 53 which contains a light sensitive controlling device. This controlling device is of the type utilizing a photoelectric cell and a grid glow tube to operate a motor relay.

In Fig. 3 the lamp 52 is shown in position opposite the windows 51, 51, on one side of the passage-way 45. On the opposite side of the passage-way from the lamp 52 is arranged the light relay denoted generally by the numeral 53'.

The relay consists in a photo-electric cell 54, which is arranged directly opposite the other window 51. This cell is in circuit with a grid glow tube 55. Alternating current of relatively low voltage is supplied to the cell 54 and the tube 55 by means of a transformer 56.

A relay 57 is included in the circuit of the cell 54 and tube 55. This light sensitive unit is of a well known type and requires no further description.

The current supply for the transformer 56 is drawn by means of leads 58 from the leads 59 and 61. Lead 59 is one side of an alternating current power line, the other side of which is the lead 61. The completion of the circuit through the lead 60 is dependent upon the operation of an ammeter denoted generally by the numeral 62. This ammeter is connected in the circuit 63 of the motor 30 which serves to drive the agitating mechanism 16 already described. The arm 64 of the ammeter 62 is connected to the lead 61. The position of the arm 64 varies with the current demand of the motor 30 and consequently responds directly to the load upon the motor. The free end of the arm 64 carries opposite contact points 65, 65. One contact point 65 is movable into engagement with the adjustable contact point 66 connected to lead 60. The other contact point 65 is movable into engagement with the adjustable contact 67, connected to lead 98.

Each of the valves controlled by several motors 13, 34, 37 and 41 is adapted to carry stationary commutators by which the circuits through the motors may be energized for definite periods of valve travel. As indicated in Fig. 3 each of these motors is intended to effect predetermined angular movements of the valves to open or close them, respectively. For this purpose the movable brine valve 12 carries a movable contact or brush 68 which travels over the stationary circular commutator sections 69 and 70, one thereof (70) being approximately one-fourth of a circle in length and the other (69) being approximately three fourths of a circle in length for a purpose which will later appear. Thus, the circuit through the motor 13 is supplied with energy through the traveling contact 68 and that one of the sections 69 or 70 with which the brush 68 is in contact providing that the circuit is closed between the commutator section and the source of current.

In like manner the measuring valves 33 of the fruit supply carries the traveling contact or brush 71 in contact with one or the other of the commutator sections 72 and 73, and The traveling contact or brush 74 of the valve member 40, which controls the supply of the cream to and from the batch tank 42, carries a traveling contact or brush 74, which travels over the commutator sections 75 and 76; also, valve 36, which controls the discharge or outlet from the cylinder 5, carries a wiping contact or brush 77, which travels over the commutator sections 77 and 79. A second brush 180 is also carried by the valve 36 and in contact with a stationary commutator section 81, for the purpose of maintaining a circuit closed through light 52 during one phase of operation.

Lead 60 is connected by lead 82 to the commutator sections 70 and 79; by lead 83 to commutator section 73 and by lead 84 to commutator section 76. The motor power circuit is completed from lead 85 of motor 41, lead 86 of motor 34 and lead 87 from motors 13 and 37, respectively, to the power line 59.

The circuits for effecting the operation of the motors to rotate the respective valves through the partial revolutions represented by the commutator sections 69, 72, 75 and 78 are dependent upon the action of the relay 57 as the same may respond to the control mechanism 53.

When the relay 57 is actuated, current flows from lead 61 through the switch 88 of the relay 57 and thence by lead 89 to the commutator section 78 of the outlet or discharge valve motor. This serves to cause motor 37 to rotate the valve 36 to the open position at which time the brush 77 passes beyond segment 78 and into contact with segment 79. It is to be remarked in passing that segment 79 will not then carry current as the circuit is broken between contacts 65 and 66.

One branch 90 of the lead 61 extends to the armature 91. This armature is normally biased to open position, but connects in its closed position with contact 92 which connects by lead 93 and branch 94 to the brush 180; to the lamp 52 through branch 95 and to the segments 69, 72 and 75 through branch 96. The lamp circuit is completed through lead 97 returning to lead 59.

The contact 67 has lead 98 passing through solenoid 99 and thence back by lead 100 to the main lead 59. Connection 101 exists between the lead 98 and solenoid 99 on one side and the segment 81 on the other.

Through the provision of the valves, motors and circuits above described the freezing mechanism may be caused to operate in cycles in the following manner and without the necessity of supervision.

Assuming the cylinder 5 to contain a batch of material drawn from the tank 42, it will be apparent that the valves 40 and 33 for the "mix" and fruit supply will be closed. The outlet valve 36 is also closed while the valve 12 for the brine is open. Electric current may now be supplied from circuit 63 to drive the motor 30, which will operate the mechanism 16 and cause the usual agitation and aeration of the "mix" or batch in the cylinder 5. During this operation, some of the material will be circulated through the passage-way 45 and past the windows 51, 51. It will be apparent, however, that the lamp 52 is not lighted by reason of the open position of the armature 91.

As the material in the cylinder is frozen to the desired consistency it offers greater resistance to the agitator 16 and consequently the load upon the motor 30 increases (as already set forth) until the current demand is sufficiently great to cause the arm 64 of ammeter 62 to move to the right to cause contact between the contact points 65 and 67. With these contacts connected, current from lead 61 flows through lead 98 and solenoid 99, thus pulling down armature 91 and closing the circuit through lamp 52 and branch 97 back to the line 59.

The closing of the armature 91 in contact with 92 allows current to pass to segment 69 thus completing the circuit through brush 68, the brine valve motor 13 and the leads 87 and 59. This causes the brine valve to rotate a three quarters of a revolution until brush 68 passes beyond the commutator segment 70. As a result of this operation the brine valve 12 is closed. An incident of this is that the load on the freezer motor is lightened.

At the same time the current flows through branch 96 to the segments 72 and 75 by which current is led through brushes 71 and 74 of the fruit valve 33 and batch valve 40 respectively, whereby the motor 34 is set in operation to rotate the valve 33 a half revolution to fruit discharging position, thereby discharging the fruit into the chamber 5, and the motor 41 is set in operation to rotate the valve 40 a one-quarter revolution, into batch tank filling position, the gearing between the shaft for the brush 74 and the stem of the valve 40 being reduced to a two-to-one ratio to provide a quarter revolution of the valve to a one-half revolution of the brush. These circuits are closed through the return leads 85, 86 and 59.

In this way a fresh charge in the batch container 42 is measured for subsequent delivery to the cylinder 5 for freezing.

The brush 180 now being in contact with the segment 81 serves to hold the armature 91 down in contact with 92 regardless of the lessened load on the motor 30, due to the cut-off of the brine, as above set forth.

With the light 52 in operation the film of material circulating upwardly through the passage-way 45 intercepts the passage of light through the windows 51, 51. During the final stage of freezing to effect the desired over-run, more or less air is incorporated in the material. In the course of producing the over-run the material, therefore, becomes less opaque and permits more light to pass through the film to the photo-electric cell 54. When the point is reached for which the device is adjusted the photo-electric cell 54 responds to the light from lamp 52 and causes the grid glow tube 55 to function and thus close the switch 88 of the relay 57.

Current from lead 61 is, therefore, delivered through switch 88 to lead 89 and thence to segment 78 of the outlet or discharge motor 37. Since brush 77 is in contact with segment 78, valve 36 performs a quarter revolution to open the discharge outlet. The opening movement is completed when the brush 77 passes beyond the segment 78 and contacts with segment 79. To provide for the quarter revolution of the discharge valve relative to the semi-revolution of the brush, the gearing between the brush and the valve stem is reduced to a two-to-one ratio. In the meantime brush 180 has been passing beyond the segment 81 and thus de-energizing coil 99 and breaking the lamp circuit through armature 91.

As the batch is discharged from the freezer, the load on the motor 30 decreases to the point where the arm 64 is no longer held in position with contact 65 against contact 67. When this connection is broken contact 65 drops back far enough to connect with contact 66. Current from lead 61 is then delivered from 60 through branch 82 to the opposite commutator sections 70 of valve 12 and 79 of valve 36. At the same time current flows through branch 83 to segment 73 and through branch 84 to segment 76 to operate the motors 34 and 41, whereby the valve 40 is rotated to the chamber filling position and the valve 33 is rotated to the position shown in Fig. 2. The wiping contacts of these several valves being at this time in contact with the above mentioned segments of the commutators, the motor circuits are closed through the return paths 87, 86 and 85 to line 59.

The several valves are, therefore, caused to make partial revolutions; closing the outlet from the chamber 5; opening the brine valve; turning the batch vat valve to discharging position and returning the fruit hopper valve to the filling position. The system is, therefore, restored to the original condition for freezing of a second batch of material.

From the foregoing description it will be seen that successive batches may be automatically measured, introduced into the cylinder, frozen, whipped-up to the desired yield, provided with fruit or other flavoring material and discharged.

It will also be seen that the "yield" may be regulated, as desired and that all testing of the material to determine the freezing and or the yield is eliminated.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. The method of operating a freezer driven by an electric motor which consists in measuring the increase of current consumption of said motor as the freezing operation takes place, using this measure to cause the discharge of the freezer and using the measure of resulting decrease in current consumption to stop the discharge from the freezer and refill the latter with a new batch.

2. In a machine of the class described, a container for materials containing an agitating mechanism, an electric motor for driving said mechanism, a plurality of motor actuated valves for controlling the supply of a heat transfer medium, for discharging the materials, and for introducing the materials, and means arranged to be actuated by the rise and fall in current consumption of said electric motor, operating when the current consumption rises to actuate each of said valve motors a predetermined amount in sequence and operating when the current consumption falls to actuate said valve actuating motors a further predetermined amount.

3. The method of operating a freezing apparatus having a container for material to be frozen, which consists in registering the change in condition of the product characteristic of the completion of the freezing of the material, then causing this registration to control in sequence the discharge of the material and the supply of material to the container.

4. An electrical system for a freezer driven by an electric motor and having separate motor operated valves for measuring the batch, for measuring another material, for controlling the cooling medium and for discharging the freezer, said system comprising a current-responsive switch in the circuit of the electric motor of the freezer, a contact engaged by said switch in its position of maximum motor current, a relay circuit from said contact to energize the several motors for actuating the valves for measuring the batch, for measuring the other material and for controlling the freezing medium, respectively, a circuit interrupter operated by each of said valves, a light-sensitive system operated by said relay system, a circuit actuated by said light-sensitive system for operating a discharge valve for the freezer, a contact engaged by said switch in its position of minimum motor current, and a circuit from said contact actuating each of said valves through said circuit interrupters.

5. A freezer comprising a receptacle, an agitator therein, a motor for the agitator, a circuit for said motor, a separate circuit having a current-responsive switch actuated by said motor circuit during operation of said motor, means actuated by the closing of said separate circuit by said switch for registering change in the condition of the material in the receptacle, a discharge valve, a motor therefor and motor operating means controlled by said registering means.

6. A freezer comprising a receptacle, an agitator therein, a motor for the agitator, a circuit for said motor, a current-responsive switch actuated by said circuit, a relay operated by said switch, a light-sensitive system operated by said relay and responsive to the changes in the material in the receptacle, a discharge valve, a motor therefor and a motor circuit energized by said light-sensitive system.

7. A freezer comprising a receptacle, an agitator therein, a motor for the agitator, a circuit for said motor, a current responsive switch actuated by said circuit, a relay operated by said switch, a light-sensitive system operated by said relay and responsive to the changes in the material in the receptacle, a discharge valve, a motor therefor, a motor circuit energized by said light-sensitive system, separate valves for introducing the batch, for measuring and introducing another material, and for controlling a freezing medium, circuits to each of said motors from said relay, and parallel circuits from said switch for simultaneously operating the motors of said valves for a predetermined amount.

8. A freezer comprising a receptacle, an agitator therein, a motor for the agitator, a circuit for said motor, a current responsive switch actuated by said circuit, a transparent passage-way in the walls of said receptacle, means for passing a portion of the material through said passage-way, a light-sensitive system arranged to receive transmitted light through said material and passage-way, a discharge valve for the receptacle, a motor therefor and motor operating means actuated by said light-sensitive system.

9. A freezer comprising a receptacle, an agitator therein, a valve for introducing the batch, a second valve for measuring and introducing another material, a cooling system and a control valve therefor, a motor for the agitator, a circuit for said motor, a current-responsive switch actuated by said circuit, a relay operated by said switch, a motor and a circuit therefor for operating each of said valves and arranged to be closed by said relay to actuate the batch valve, the material valve and the control valve to predetermined positions, a light-sensitive system operated by said relay and responsive to the condition of the materials in the container, a discharge valve for said container, a motor and a circuit therefor for actuating the discharge valve upon the response of the light-sensitive system, and a second circuit closed by said switch for operating each of said valves to predetermined positions.

10. In a freezing mechanism, the combination of a freezing chamber, agitating mechanism therein, an electric motor for driving said mechanism, a circuit for said motor, a cooling system having a valve, a discharge valve for the freezing chamber, an electric motor for operating each of said valves, a circuit for each motor, electric means for controlling said discharge valve, a current responsive switch actuated by the circuit for the first mentioned motor, arranged to close the circuit to the motor for the valve for said cooling system and to close the circuit for said electric means.

11. In a freezing mechanism, a freezing chamber having an agitating mechanism, said chamber being provided with a passage way through which a portion of the material flows during freezing, said passage way having windows in its opposed walls, a light arranged opposite one window to project its beams through the material as it passes said windows, a light-sensitive device affected by the permeability to light of the material passing said windows, and electrical means actuated by said device, whereby the discharge from said chamber may be controlled.

12. In a freezing mechanism, a freezing chamber having an agitating mechanism, said chamber being provided with a passage way through which a portion of the material flows during freezing, said passage way having windows in its opposed walls, a light arranged opposite one window to project its beams through the material as it passes said windows, a light-sensitive device affected by the permeability to light of the material passing said windows, electrical means actuated by said device to control the discharge and filling of said chamber, and means dependent on the viscosity of the material as it freezes to automatically light said light.

13. In a freezing mechanism, the combination of a freezing chamber, having an outlet, a valve for said outlet, means for operating said valve to open position, as agitating mechanism within said chamber, driving means for said mechanism including an electric motor, and means dependent upon the permeability to light of the material characteristic of the completion of the freezing thereof, for controlling said operating means, the operation of said controlling means being dependent upon a predetermined load upon said agitating mechanism.

14. In a freezing mechanism, the combination of a freezing chamber, having an inlet and an outlet, a valve for said inlet, a valve for said outlet, means for opening and closing each valve, an agitating mechanism within said chamber, driving means for said mechanism, a conduit connected at its opposite ends to said chamber to permit flow of material therethrough during the freezing operation, said conduit having aligned windows, and electrically operating means controlled by the light passing through said windows for operating each of said valves.

15. In a freezing mechanism, the combination of a freezing chamber having a valved opening, agitating mechanism in the freezing chamber, an electric motor for operating said mechanism, a circuit for said motor, means for operating the valve for said opening, and means including a separate circuit and a switch therein responsive to the load upon said mechanism due to the freezing of the material for closing said separate circuit, electrical means arranged to be set in operation by the closing of said separate circuit and operable by the permeability of light characteristic of the freezing of the material to actuate said operating means.

16. In a freezing mechanism, the combination of a freezing chamber having a valved opening, a cooling system for said chamber, including a valve controlling the supply of a refrigerant to said system, a motor and a circuit therefor for operating each of said valves, means including a separate circuit and a switch therein responsive to the load upon said mechanism due to the freezing of the material for closing said separate circuit, for actuating said motors.

17. In apparatus of the class described, the combination of a material holding chamber having filling and discharge devices and a by-pass through which a portion of the material passes during treatment thereof, said by-pass having related transparent portions, a heat exchange system, a mechanism for agitating the material in said chamber, a drive means for said mechanism, and means responsive to the permeability to light of the material passing said transparent portions in said by-pass for controlling said devices and heat exchange system in a predetermined sequence.

18. In a freezing apparatus, the combination of a freezing chamber having refrigerating means controlled by a valve and a by-pass through which a portion of the material passes during treatment thereof, said by-pass having related transparent portions, an inlet and an outlet, valves for said inlet and outlet, respectively, means for operating each of said valves to first move it a partial rotation to one position and then to move it to its first position, the movements of said valves being in a predetermined sequence, and means responsive to permeability to light of the material passing said transparent portions in said by-pass for controlling said operating means.

19. The method of operating a freezer having a container for the material, which consists in agitating the material and simultaneously subjecting it to a heat transfer medium, then in registering on a light sensitive device the change in permeability to light of the product characteristic of the completion of freezing of the material, and then in causing this registration to effect discharge of the material.

20. The method of operating an electric driven freezer having a material container, which consists in first measuring the increasing current consumption of the motor as the freezing of the material takes place and cutting off the supply of refrigeration in response to a predetermined current increase, and then in registering on a light-sensitive device the characteristic increase in permeability to light of the completion of the freezing of the material to cause the discharge of the material.

CLIFFORD MORROW.